United States Patent
Alvarez et al.

(10) Patent No.: US 7,917,273 B2
(45) Date of Patent: Mar. 29, 2011

(54) DRIVING ASSISTANCE FUNCTION ON FOLLOWING A QUEUE OF VEHICLES

(76) Inventors: Belen Alvarez, Paris (FR); Xavier Marie Groult, Survilliers (FR); Frederic Vantalon, Bois Colombes (FR)

( * ) Notice: Subject to any disclaimer, the term of this patent is extended or adjusted under 35 U.S.C. 154(b) by 892 days.

(21) Appl. No.: 11/120,367

(22) Filed: May 3, 2005

(65) Prior Publication Data

US 2006/0111828 A1 May 25, 2006

(30) Foreign Application Priority Data

May 7, 2004 (EP) ..................................... 04291183

(51) Int. Cl.
*G06G 7/00* (2006.01)
(52) U.S. Cl. ............. 701/78; 701/96; 303/167; 180/275
(58) Field of Classification Search .................... 701/78, 701/96; 303/167; 180/275
See application file for complete search history.

(56) References Cited

U.S. PATENT DOCUMENTS

| | | | | |
|---|---|---|---|---|
| 4,629,043 A * | 12/1986 | Matsuo et al. | ................ | 477/184 |
| 6,017,102 A * | 1/2000 | Aga | ............... | 303/191 |
| 6,346,064 B1 * | 2/2002 | Hada et al. | ..................... | 477/171 |
| 6,670,810 B2 | 12/2003 | Duncan et al. | | |
| 2003/0227215 A1 * | 12/2003 | Kinder et al. | ..................... | 303/3 |
| 2004/0017106 A1 * | 1/2004 | Aizawa et al. | ................ | 303/191 |
| 2004/0226768 A1 * | 11/2004 | DeLuca et al. | ................ | 180/275 |

FOREIGN PATENT DOCUMENTS

| EP | 1083075 | | 3/2001 |
|---|---|---|---|
| EP | 1083075 | A1 * | 3/2001 |

* cited by examiner

*Primary Examiner* — Mark Hellner
*Assistant Examiner* — Helal A Algahaim
(74) *Attorney, Agent, or Firm* — Dickinson Wright PLLC

(57) ABSTRACT

A process for assisting the driving of a vehicle in a situation of following a queue. The vehicle is provided with a braking system and a plurality of sensors measuring values of variables defining an instantaneous state of the vehicle. The process includes the steps of: comparing the state of the vehicle with an entry state by testing a plurality of entry conditions; when the entry conditions are simultaneously verified, comparing the state of the vehicle with an exit state by testing a plurality of exit conditions; while at least one exit condition is not verified, generating a braking force value (F); and transmitting the value of the braking force generated as the target braking force ($F_{target}$) to the braking system.

9 Claims, 4 Drawing Sheets

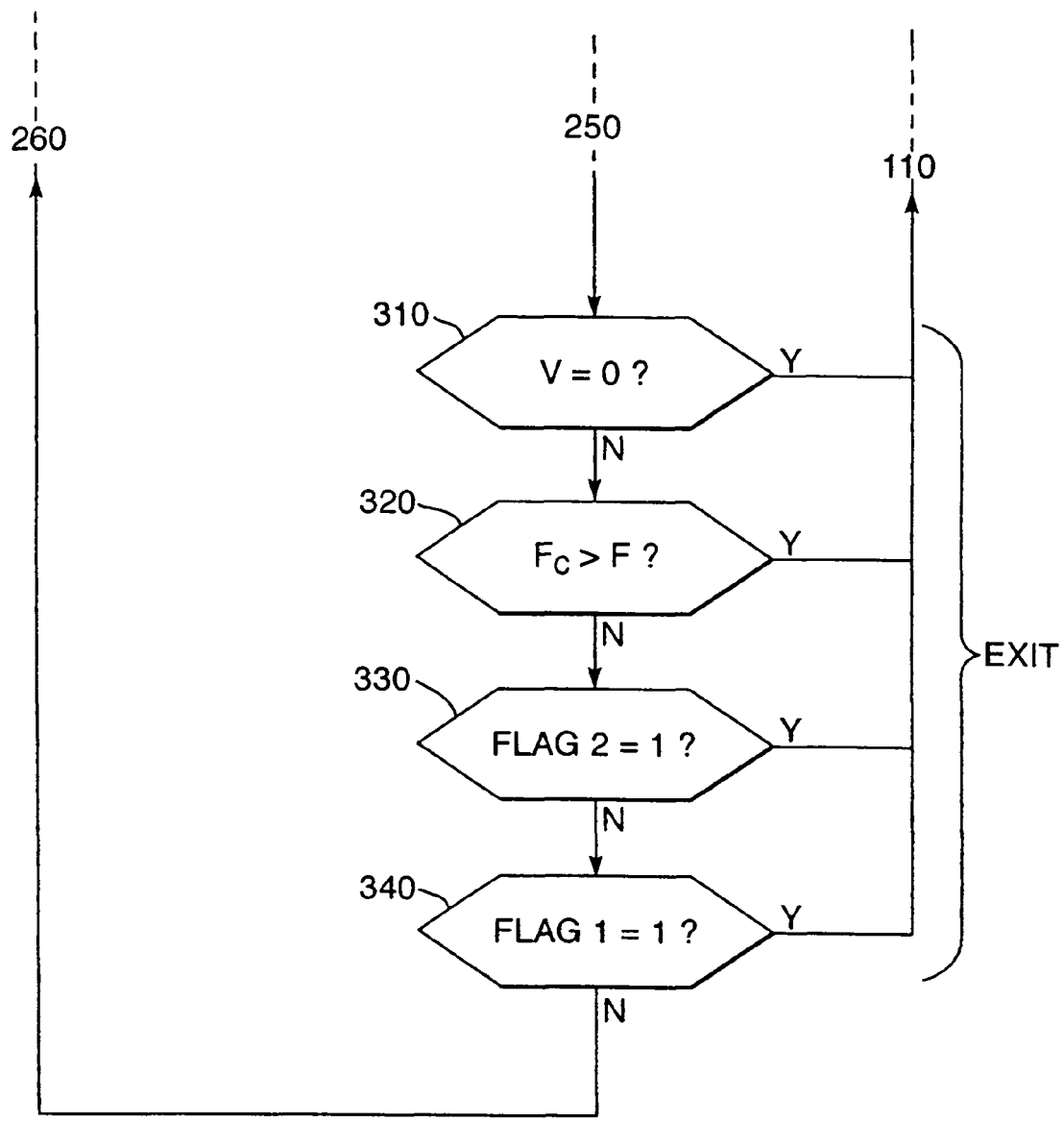

DRIVING ASSISTANCE FUNCTION ON FOLLOWING A QUEUE OF VEHICLES

TECHNICAL FIELD

The invention relates to a process for assisting driving. More particularly the invention relates to a process for assisting driving when the vehicle in question is in slow-moving, heavy traffic, when the driver is forced to follow a queue of vehicles. This is typically the case when the vehicle is in a traffic jam.

BACKGROUND OF THE INVENTION

In this situation, it can be tedious for the driver to repeatedly press on the brake pedal to reduce the velocity of the vehicle when the distance from the preceding vehicle is reduced, and then to press on the accelerator pedal to move the vehicle away again when the distance from the preceding vehicle increases. In addition to these repetitive operations of braking and acceleration, the driver must manage the clutch, using a clutch pedal, when the vehicle has a manual gearbox because the engine must be disconnected from the wheels during braking and connected to the wheels during acceleration.

The aim of the invention is therefore to resolve the disadvantages connected with driving in a situation of following a queue.

SUMMARY OF THE INVENTION

An object of the invention is a process for assisting braking of a vehicle, the vehicle being provided with a braking system including brake calipers able to be activated as a function of a target braking force, the process including the steps of:

determining an instantaneous state of the vehicle defined by at least one state variable, the value of which is obtained from measurements performed by means of at least one sensor with which the vehicle is provided;

testing a logical entry event by testing whether the instantaneous state verifies a logical entry condition; and, when the logical entry condition is verified, testing a logical exit event by testing whether the instantaneous state verifies a logical exit condition; and generating and emitting a braking force value as a target braking force to activate the brake calipers, while the logical exit condition is not verified.

In one embodiment, the logical entry event is defined by intersection of a plurality of entry events respectively defined by verification of an elementary entry condition.

The elementary entry condition may be a condition of maximum velocity of the vehicle, which entry condition is verified when the instantaneous value of the velocity of the vehicle is less than a threshold velocity.

The elementary entry condition may be a minimum velocity of the vehicle, which entry condition is verified when the instantaneous value of the velocity of the vehicle is greater than a zero velocity.

The elementary entry condition may be a clutch pedal position condition, which entry condition is verified when the value emitted by a sensor able to detect the position of a clutch pedal corresponds to a completely depressed condition of the clutch pedal.

The elementary entry condition may be an accelerator pedal position condition, which entry condition is verified when the value emitted by a sensor able to detect the position of an accelerator pedal corresponds to a completely released position of the accelerator pedal.

In one embodiment, a logical exit event is defined by the merging of a plurality of exit events respectively defined by verification of an elementary exit condition.

The elementary exit condition may be a vehicle velocity condition, which exit condition is verified when the instantaneous value of the velocity of the vehicle is zero.

The elementary exit condition may be a braking force condition, which exit condition is verified when the value of the braking force required by the driver is greater than the value of the braking force generated in the generation step.

The elementary exit condition may be an accelerator pedal position condition, which exit condition is verified when the value emitted by a sensor able to detect the position of an accelerator pedal corresponds to a depressed position of the accelerator pedal.

The elementary exit condition may be a clutch pedal position condition, which condition is verified when the value emitted by a sensor able to detect the position of a clutch pedal corresponds to a completely released position of the clutch pedal.

The process may include a step of measuring the period since the logical entry event, and the braking force generated has a zero value while the period is less than a predefined lower threshold period.

The process may include a step of measuring the period since the logical entry event, and the braking force generated has a value that is an increasing function of the period.

Another object of the invention is software for assisting driving, and more particularly following a queue, containing instructions suitable to be read and stored on a support, the instructions being executable by a host computer, wherein the software implements one of the above processes.

The invention also has as its aim a programmable braking controller able to implement one of the above processes in a vehicle braking system, including a memory space able to store instructions of a program, a computer able to execute the instructions and an input/output interface connectable at its input to at least one sensor with which the vehicle is provided, and at its output to at least one brake caliper activation unit of the braking system, wherein the controller is programmed to include:

means for determination of an instantaneous state of the vehicle, which state is defined by at least one state variable obtained from measurements performed by means of the at least one sensor;

means for testing a logical entry event able to test whether the instantaneous state verifies a logical entry condition;

means for testing a logical exit event able to test whether the instantaneous state verifies a logical exit condition;

means for generation and emission at its output of a braking force value as the target braking force; and means for real time incrementation of a temporal variable.

The invention also has as its object a braking system intended to be fitted to a vehicle including a plurality of sensors, a braking controller, and brake caliper activation units, wherein the braking controller is a programmable braking controller such as the controller described above.

In one embodiment, the above braking system includes at least one electromechanical brake caliper intended to be fitted to a rear wheel of the vehicle.

The invention also has as its aim a vehicle including a braking system such as the one described above.

Advantageously, the assistance process in accordance with the invention is implemented by programming suited to the braking controller available to the braking system. In still more advantageous manner, the invention is implemented in a vehicle provided with a hybrid or all-electric braking system, that is to say including at least two electromechanical calipers at the rear, to apply a target braking force to the rear wheels transparently for the driver and without noise so as not to be detrimental to his comfort.

BRIEF DESCRIPTION OF THE DRAWINGS

The invention will be better understood and other aims, details, characteristics and advantages of it will become more clearly apparent in the course of the following description of a particular embodiment of the invention, given solely in illustrative and non-limiting manner, with reference to the attached drawings. In these drawings.

DESCRIPTION OF THE PREFERRED EMBODIMENTS

Figure 1:
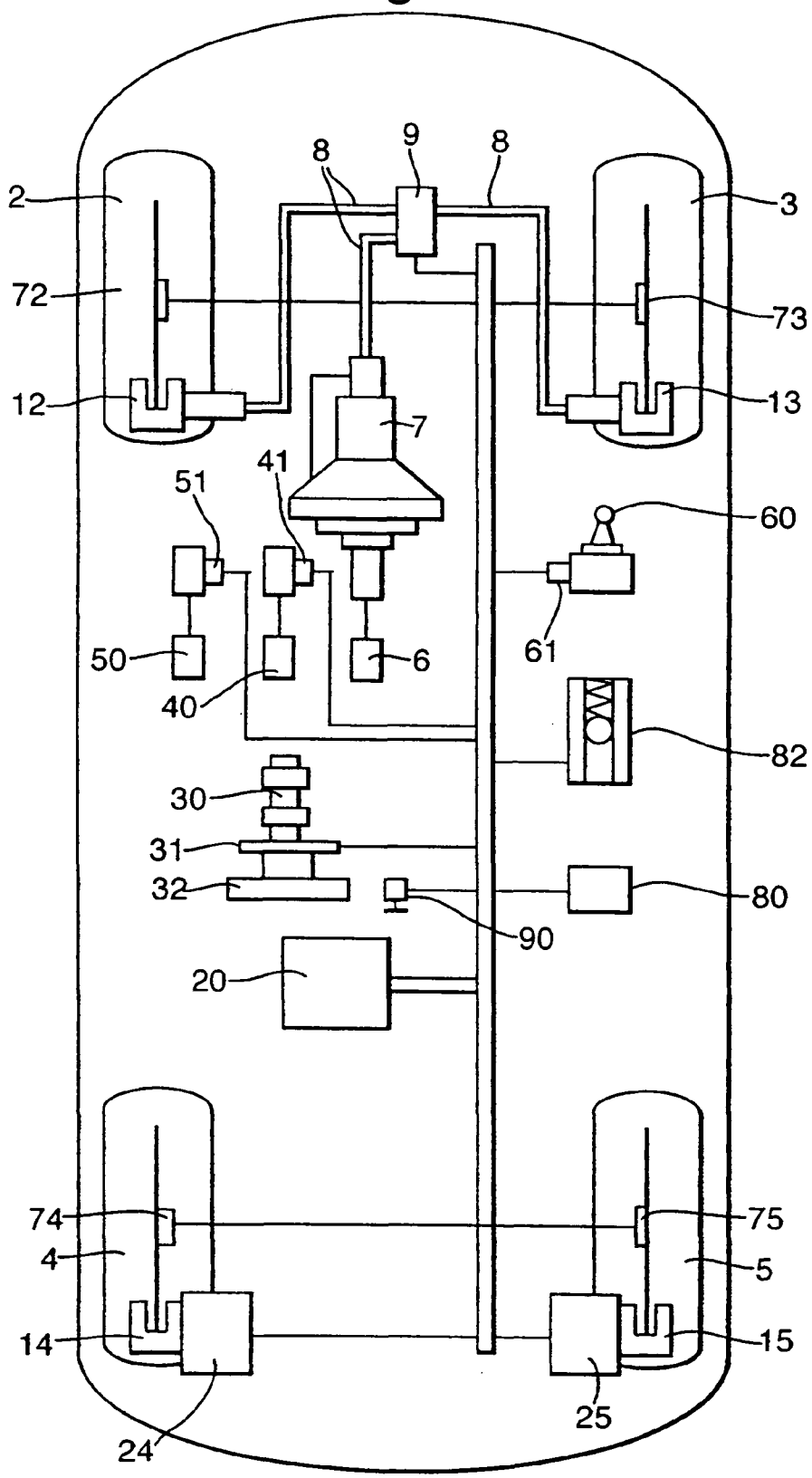
FIG. 1 shows diagrammatically a vehicle fitted with a hybrid braking system.

Although the assistance process in accordance with the invention can be implemented whatever the type of braking system with which the vehicle is provided, in the currently preferred embodiment, the vehicle is fitted with a hybrid braking system such as will now be described in detail with reference to FIG. 1.

A vehicle 1 includes two front wheels 2 and 3 and two rear wheels 4 and 5. The hybrid braking system includes a brake pedal 6 connected to a master-cylinder 7. When the brake pedal 5 is depressed, the master-cylinder 7 generates a hydraulic over-pressure that is propagated via the hydraulic unit 9 and pipes 8 to the hydraulic brake calipers 12 and 13 fitted to the front wheels 2 and 3 respectively.

The rear wheels 4 and 5 are respectively fitted with electromechanical calipers 14 and 15. When the driver presses on the brake pedal 6, the hydraulic unit 9 also emits an electrical signal proportional to the over-pressure generated by the master-cylinder 7, indicating the braking force $F_c$ required by the driver. A braking controller 20 receives this electrical signal. The braking controller 20 includes at least a computer and a memory able, inter alia, to store programs including a series of instructions executable by the computer of the controller 20. The controller 20 includes an input/output interface permitting at the input acquisition of input signals from sensors and storage of the corresponding values in memory spaces and permitting at the output the emission of signals as a function of values read from the memory space. In response to this signal, the controller 20 calculates right zone and left zone target braking forces, which are to be respectively applied by the electromechanical calipers 14 and 15 to the corresponding rear wheels 4 and 5. Then the controller 20 transmits control signals corresponding to the right and left target braking forces to remote computers 24, 25 that respectively govern the activation of one electromechanical caliper. They adjust the value of the strength in amplitude and phase of the current supplied to the motor with which the electromechanical brake caliper is provided, the current strength coming from a battery and an alternator, which are not shown.

Moreover, the vehicle 1 is provided with a plurality of sensors permitting measurement of the instantaneous value of different variables.

The steering column 30 is, for example, provided with a sensor 31 permitting measurement of the angle of lock imparted by the driver to the steering wheel 32.

The accelerator pedal 40 includes a sensor 41 permitting measurement of the degree of depression of the accelerator pedal. The sensor 41 can be a continuous sensor. The sensor 41 is preferably discreet and has for example two positions. It emits a binary signal Flag2 taking a zero value when the driver does not press on the accelerator pedal, and the value unity when the driver presses on the accelerator pedal so as to depress it.

The clutch pedal 50 includes a sensor 51. The sensor 51 can be a continuous sensor. However, preferably, in particular to limit cost, the sensor 51 is a discreet sensor with for example three positions: a first position corresponds to the emission of a signal Flag1 having the value unity when the driver does not press on the clutch pedal 50, in the case in which the engine is connected to the wheels; a second position corresponds to emission of a signal Flag1 of zero value when the driver presses on the clutch pedal 50 so as to be at the point of slip; lastly, the sensor 51 can be in a third position, the signal Flag1 then emitted can for example have a value unity marked with a negative sign. This last position corresponds to the case in which the clutch pedal is depressed beyond the point of slip, the engine is then disconnected from the drive wheels.

If it includes a manual gearbox 60, the vehicle 1 can be provided with a sensor 61 giving the position of the gear lever. Advantageously, the sensor 61 is an optical discreet sensor having a plurality of positions: the first position corresponds to reverse gear, the output value is for example −1; when the gear lever is in the neutral or dead point position, the sensor 61 emits a signal the value of which is 0; lastly, when a forward gear is selected, the sensor 61 emits a signal of value +1.

The vehicle 1 also includes a plurality of sensors permitting determination of the kinematic state of the vehicle.

Each of the wheels 2-5 is provided with a wheel velocity sensor 72-75. A wheel velocity sensor permits measurement of the instantaneous rotational velocity of the wheel to which it is fitted. This information allows the controller 20 to calculate an instantaneous velocity V of the vehicle.

To measure the acceleration, the vehicle 1 includes a lateral acceleration sensor 80 and a longitudinal acceleration sensor 82.

The different sensors that have just been described are connected to the controller 20, via a network supporting for example the CAN-Bus protocol.

The vehicle 1 includes a switch 90 arranged at the driver's seat, for example on the dashboard. By pressing the switch 90, the driver starts execution of the assistance program so as to allow the function for assistance in following a queue to be active or otherwise.

Figure 2A:
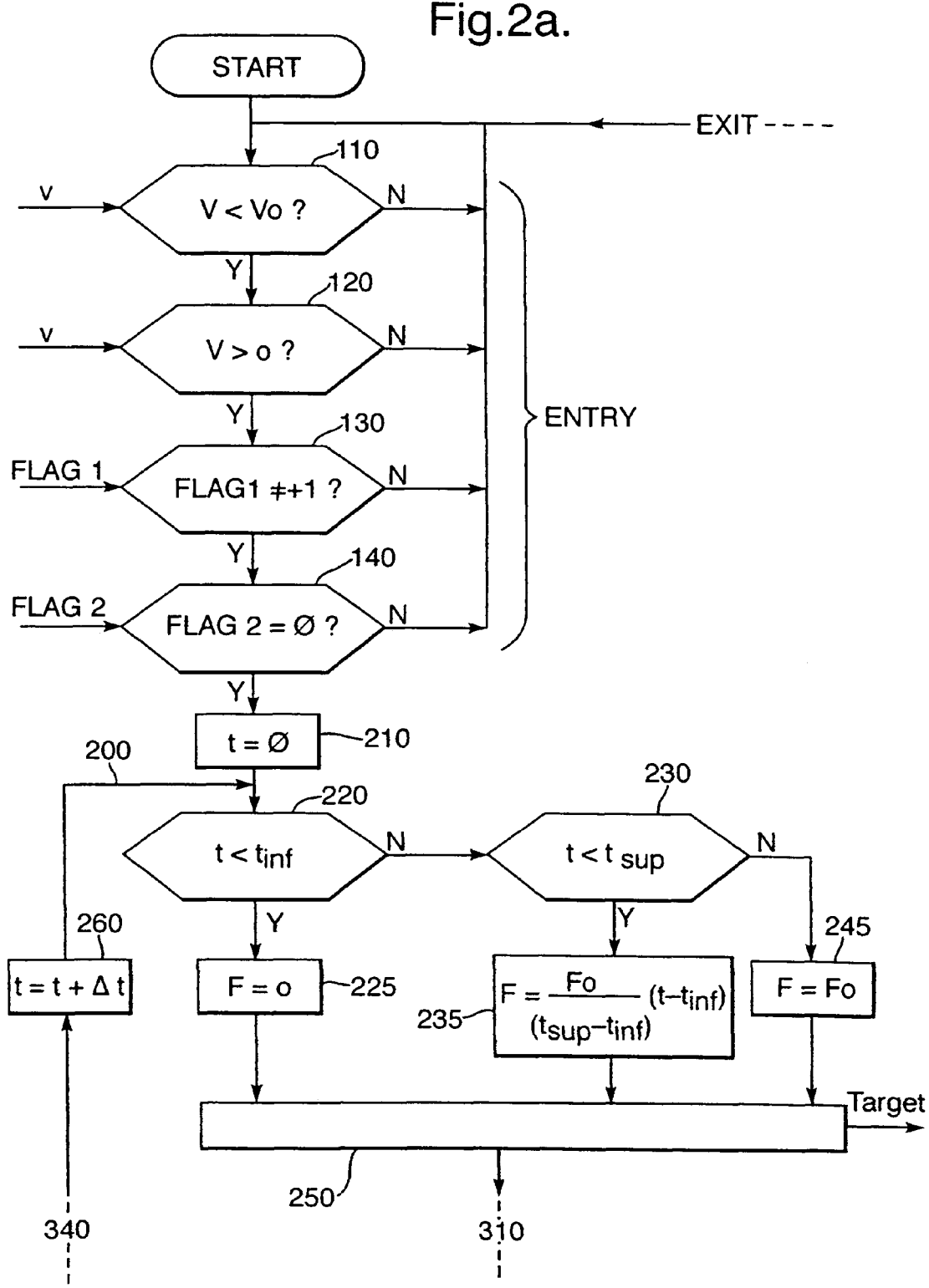
FIG. 2 is an algorithm representing the different steps of the process for assisting driving in accordance with the invention, implemented in software form in the vehicle of FIG. 1.

FIG. 2 shows an algorithm indicating the succession of steps of the process for assisting driving in accordance with an embodiment of the present invention that can be used in a situation of following a queue. In the preferred embodiment, this algorithm is implemented by an assistance program stored in the memory space of the braking controller 20 and executed in real time.

By toggling the switch 90, the driver indicates that he wishes to be assisted in following a queue. The assistance program is then repetitively executed by the controller 20 so as to provide an assistance function to the driver. Diagrammatically, the assistance program tests the existence of a logical entry event by testing whether the instantaneous state of the vehicle verifies a logical entry condition. The logical entry event is the intersection of entry events respectively defined by verification of an elementary entry condition. When the logical entry event is detected, the assistance program enters a main braking management loop, which loop is time indexed. The vehicle is then lightly braked while the instantaneous state does not correspond to a logical exit state, i.e. while a logical exit event does not occur. The logical exit event is the merging of exit events respectively defined by verification of an elementary exit condition. It is sufficient for only one of these elementary exit conditions to be verified for the assistance program to cease to brake the vehicle. Execution of the main loop is then quitted to resume execution of the program at its start.

In more detailed manner, the instantaneous state of the vehicle is compared with an entry state indicating that the vehicle must be braked. This entry state is, in the embodiment currently envisaged, defined by the merging of four elementary entry conditions in addition to the fact that the switch 90 has been triggered by the driver.

The first entry condition 110 is a velocity condition. The velocity V of the vehicle must be lower than a threshold velocity $V_0$. The value of the threshold velocity $V_0$ is low, for example 20 km/h. This signifies that if the velocity of the vehicle is such that the velocity is less than 20 km/h, the assistance function can activate braking. For a velocity greater than the threshold velocity $V_0$, it is judged that the vehicle is not in a situation of following a queue and must not therefore be braked by the present function.

The second entry condition 120 is also a velocity condition. To enter the main braking loop, the vehicle must not be stationary. The velocity V must therefore be greater than zero. In fact, it is not necessary to brake the vehicle if it is already at rest.

The third entry condition 130 is a condition of the value of the clutch engagement signal Flag1. The clutch engagement sensor 51 has been described above as a sensor able to emit a signal having discrete values. To enter the main braking loop, the clutch engagement signal value must correspond to the point of slip or complete declutching. In fact, if the driver declutches, this indicates that the engine is no longer driving the vehicle. If no torque is applied, the management of the brakes can be taken over by the assistance function. Consequently, the signal Flag1 from the clutch engagement sensor must not correspond to the value +1 corresponding to an engaged position of the pedal.

Lastly, the last entry condition 140 consists of an accelerator pedal 40 condition. The sensor 41 placed on the accelerator pedal 40 is a switch emitting a discreet signal. The 4th entry condition therefore corresponds to verification that the accelerator signal Flag2 is zero, that is to say that the driver is not pressing on the accelerator pedal. The fact that the driver is not accelerating constitutes information saying that the driver wishes to see the vehicle braked.

Once these entry conditions are verified simultaneously, that is to say that the instantaneous state of the vehicle corresponds to the entry state defined by these conditions, the program enters a main brake management loop 200.

The loop 200 is indexed by the value of a temporal variable t acting as a chronometer. The variable t measures the period that has elapsed since the logical entry event, and is periodically incremented while an exit event does not occur. In step 210, the temporal variable t is initialised.

The loop 200 starts with the comparison in step 220 of the value of the variable t with a predefined lower threshold period $t_{inf}$, for example of 1.5 second. If the value of t is less than 1.5 second, the braking force F generated by the assistance program (step 225) is zero. The braking force generated is transmitted in step 250 as the target braking force $F_{target}$ to the units for activation or control 24 and 25 of the electromechanical brakes with which the rear wheels are fitted. More precisely, the target braking force $F_{target}$ is transmitted to a known arbitration algorithm. This algorithm selects, from all the target braking force requests which are sent to it from assistance functions but also for example from the ABS system, the request which has the highest priority. This arbitration algorithm then transmits the target braking force selected to the remote control units.

If, in step 220, the value of the variable t is greater than 1.5 second, the program passes to step 230. The step 230 consists of comparing the value of the temporal variable t with a predefined upper threshold period $t_{sup}$, for example 2.5 seconds. If the value of t is less than 2.5 seconds, then the braking force generated is an increasing function of t, that is to say of time. For example, in step 235 the braking force F is an increasing linear function of time. The corresponding value of the target braking force is then transmitted to the electromechanical brake control units (step 250).

Lastly, if in step 230 the value of the variable t is greater than 2.5 seconds, the value of the braking force F generated is equal to a saturation value of the braking force $F_0$. For example, the target braking force $F_0$ corresponds to deceleration of the vehicle of 1.5 ms$^{-2}$. It is to be noted that the maximum deceleration of the vehicle obtained by braking the two rear wheels alone is of the order of 3 ms$^{-2}$. In step 250, the corresponding value of the target braking force is transmitted to the electromechanical brake control units.

The execution of the temporal loop 200 continues with verification of a plurality of elementary exit conditions which, when they are verified, respectively define elementary exit events. The merging of these elementary events defines a logical exit event. When this logical exit event occurs, the program immediately quits the main loop 200 and resumes at step 110 the determination of the instantaneous state to enter the main braking loop, the switch 90 still being in the position in which the driver wishes to be assisted.

The first elementary exit condition 310 is a condition of the velocity V. The instantaneous velocity V of the vehicle is compared with the value zero. In fact, if the vehicle is finally stationary, it is no longer necessary to continue execution of the assistance function. If this velocity condition is not verified, the program passes to verification of a second exit condition.

The second elementary exit condition 320 is a condition of the braking force $F_c$ required by the driver by operation of the brake pedal 6. If the braking force required by the driver $F_c$ is greater than the current value of the braking force F generated by the assistance function, it is necessary to return control to the driver, as this is probably emergency braking. The assistance program must therefore immediately quit the main brake management loop 200.

If the clamping force $F_c$ required by the driver remains lower than the force F generated by the present assistance function, the program passes to verification of a third exit condition 330. This third exit condition 330 relates to the state of the accelerator sensor 41. If the signal Flag2 from this sensor has a value equal to 1, this means that the driver is depressing the accelerator pedal and wishes to increase the velocity of the vehicle. This means that the driver no longer wishes the vehicle to be slowed. It is therefore necessary to quit the main braking management loop 200.

Conversely if the driver does not depress the accelerator pedal, the main loop 200 continues with verification of a fourth exit condition 340 which relates to the value of the signal from the clutch engagement sensor 51. If the value of the signal Flag1 emitted by the clutch engagement sensor 51 is equal to +1, this signifies that the driver is connecting the engine to the wheels to drive the vehicle. It is then necessary to quit the main loop 200 of the assistance function.

If none of these elementary exit conditions is verified, the main loop 200 is closed at step 220 after the temporal variable t has been incremented, in real time, by a predetermined value Δt, for example 10 milliseconds.

It is to be noted that step 220 allows a short time lapse before a braking request is transmitted to the rear electromechanical calipers. In fact, it may be that the entry conditions are verified a priori but that the driver does not, in fact, wish to see the vehicle braked. During this time lapse (1.5 second), the exit conditions are regularly tested to give the opportunity of leaving the braking management loop. If the instantaneous state is such that the program remains in the main loop more than 1.5 second, then the braking is progressively activated until the value of the target braking force attains the saturation value $F_0$.

Figure 3:
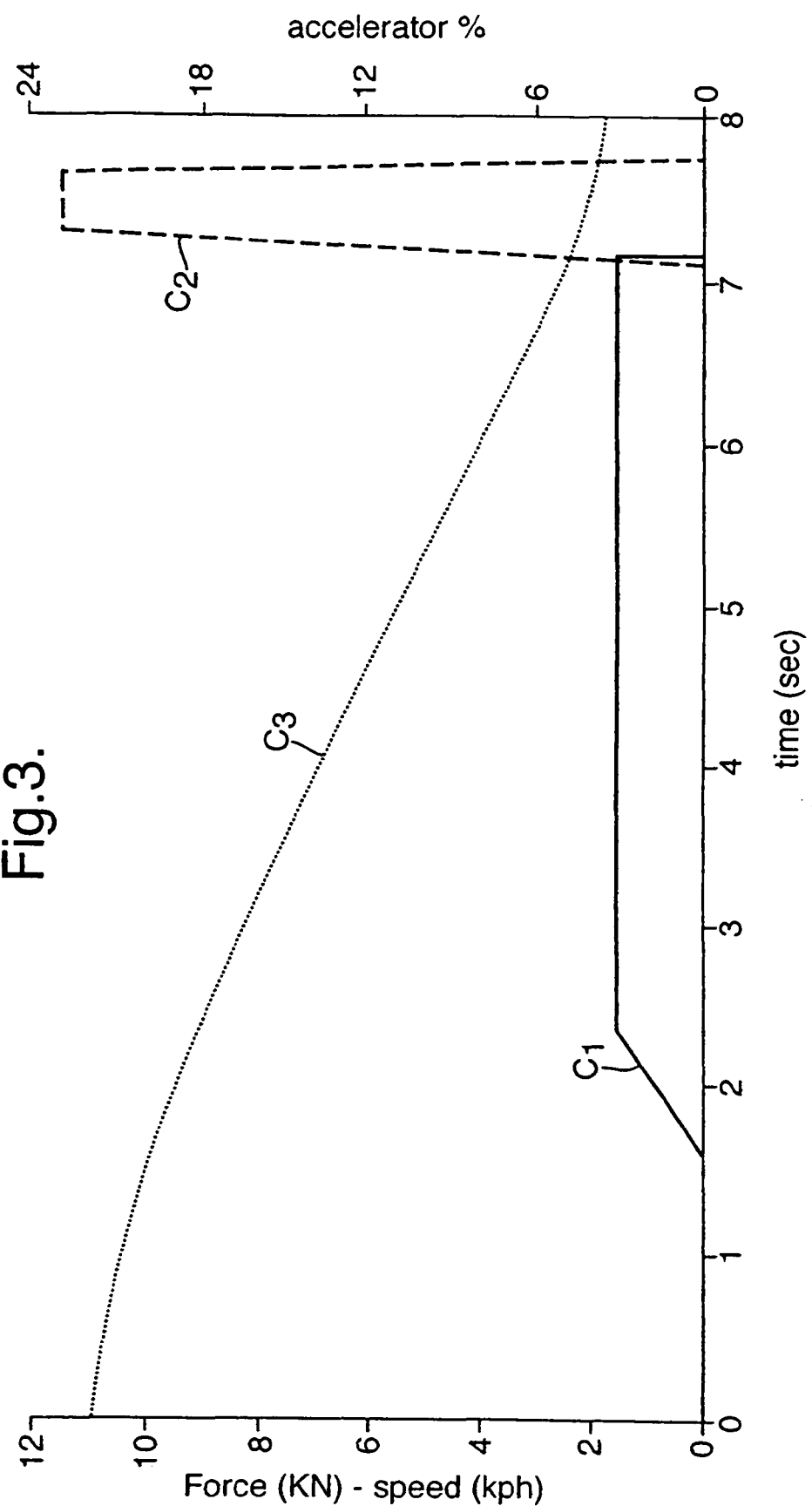
FIG. 3 shows graphs giving the temporal evolution of the applied braking force, of the vehicle velocity and of the accelerator sensor output respectively.

The applicant implemented the program described above in the braking controller 20 of a vehicle 1 having a hybrid braking system. Different tests were performed. FIG. 3 shows the temporal variations of certain variables during one of these tests.

At a previous instant, the driver has toggled the switch 90 to request implementation of the assistance function for following a queue. At the instant t=0, all the entry conditions are simultaneously verified.

In the first second and a half, a braking force of zero value is required. Then, as the instantaneous state of the vehicle continues to not verify one of the exit conditions, the braking force is progressively increased for the deceleration of the vehicle to correspond to a value of 1.5 ms$^{-2}$ (curve C1). The value of the braking force is kept constant at a maximum value, until an exit event causes quitting of the main brake management loop. Here, the driver presses on the accelerator pedal. The curve C2 shows the degree of depression of the accelerator pedal 40. Clearly, as soon as the driver presses on the accelerator pedal 40, the exit condition 330 is verified. The program then ceases to emit a target braking force request. This drops back to the value zero.

The curve C3 shows the instantaneous velocity of the vehicle during the test. The velocity V decreases slightly and then to a greater extent and at a constant rate when the braking force required by the assistance function is equal to $F_0$. As soon as the driver presses on the accelerator pedal, the velocity ceases to decrease as quickly.

Although the invention has been described with reference to a particular embodiment, it is quite obvious that it is in no way limited to it and that it includes all the technical equivalents of the means described and their combinations if these enter within the scope of the invention.

The invention claimed is:

1. A method of automatically braking a vehicle having an accelerator pedal and wheel brakes comprising the steps of;
    establishing a predetermined threshold velocity,
    measuring the velocity of the vehicle,
    comparing the velocity of the vehicle to the threshold velocity,
    sensing one of a depressed and an unpressed position of the accelerator pedal,
    beginning an automatic braking loop in response to the measured velocity being greater than zero and less than the threshold velocity and in response to the accelerator pedal being in the unpressed position,
    applying a braking force with the wheel brakes to slow the vehicle,
    sensing the position of the accelerator pedal,
    ending the automatic braking loop in response to the accelerator pedal being in the pressed position,
    measuring the velocity of the vehicle, and
    ending the automatic braking loop in response to the velocity of the vehicle being zero.

2. The method as set forth in claim 1 wherein the vehicle further includes a clutch pedal and further including the step of sensing one of an unpressed and a pressed to a slip point and a pressed past the slip point position of the clutch pedal and wherein the beginning an automatic braking loop step is in further response to the clutch pedal being in one of the pressed to the slip point and pressed past the slip point positions.

3. The method as set forth in claim 2 further including the steps of sensing the position of the clutch pedal and ending the automatic braking loop in response to the clutch pedal being in the unpressed position.

4. The method as set forth in claim 1 further including the steps of;
    measuring the time the vehicle is in the automatic braking loop,
    comparing the measured time to a predefined lower threshold time, and
    applying zero braking force in response to the measured time being less than the predefined lower threshold time.

5. The method as set forth in claim 4 wherein the predefined lower threshold time is 1.5 seconds.

6. The method as set forth in claim 1 further including the steps of:
    measuring the time the vehicle is in the automatic braking loop,
    comparing the measured time to a predefined upper threshold time,
    measuring the braking force of the wheel brakes,
    increasing the braking force to a target braking force as a linear function of the measured time in response to the measured time being less than the predefined upper threshold time.

7. The method as set forth in claim 6 wherein the predefined upper threshold time is 2.5 seconds.

8. The method as set forth in claim 6 further including the step of applying the target braking force in response to the measure time being greater than the predefined upper threshold time.

9. A method of automatically braking a vehicle having an accelerator pedal and a clutch pedal and wheel brakes comprising the steps of;
    establishing a predetermined threshold velocity,
    measuring a velocity of the vehicle,
    comparing the velocity of the vehicle to the threshold velocity,
    sensing one of an unpressed and a pressed to a slip point and a pressed past the slip point position of the clutch pedal,
    sensing one of a depressed and an unpressed position of the accelerator pedal,
    beginning an automatic braking loop in response to the measured velocity being greater than zero and less than the threshold velocity and in response to the clutch pedal being in one of the pressed to the slip point and pressed past the slip point positions and in response to the accelerator pedal being in the unpressed position,
    measuring a time the vehicle is in the automatic braking loop, comparing the measured time to a predefined lower threshold time of 1.5 seconds,
comparing the measured time to a predefined upper threshold time of 2.5 seconds,
measuring a braking force of the wheel brakes,
applying zero braking force in response to the measured time being less than the predefined lower threshold time,
increasing the braking force to a target braking force as a linear function of the measured time in response to the measured time being greater than the predefined lower threshold time and less than the predefined upper threshold time,
applying the target braking force in response to the measured time being greater than the predefined upper threshold time,
sensing the position of the accelerator pedal,
ending the automatic braking loop in response to the accelerator pedal being in the pressed position,
sensing the position of the clutch pedal,
ending the automatic braking loop in response to the clutch pedal being in the unpressed position,
measuring the velocity of the vehicle, and
ending the automatic braking loop in response to the velocity of the vehicle being zero.

* * * * *